United States Patent
Yu et al.

(10) Patent No.: US 8,447,735 B2
(45) Date of Patent: May 21, 2013

(54) BACKING UP DATA OBJECTS IDENTIFIED BY SEARCH PROGRAM AND CORRESPONDING TO SEARCH QUERY

(75) Inventors: Jean X. Yu, Austin, TX (US); Yan Xiao, Acton, MA (US); Thomas E. O'Brien, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 12/968,134

(22) Filed: Dec. 14, 2010

(65) Prior Publication Data
US 2012/0150810 A1    Jun. 14, 2012

(51) Int. Cl.
*G06F 7/00* (2006.01)
*G06F 17/30* (2006.01)
(52) U.S. Cl.
USPC .......................................... 707/654; 707/769
(58) Field of Classification Search
USPC ................................. 707/654, 769
See application file for complete search history.

(56) References Cited

U.S. PATENT DOCUMENTS 7,194,691 B1 * 3/2007 Zilka et al. ..................... 715/739
7,734,593 B2 * 6/2010 Prahlad et al. ................ 707/640

* cited by examiner

*Primary Examiner* — Kuen Lu
(74) *Attorney, Agent, or Firm* — Feb R. Cabrasawan

(57) ABSTRACT

A backup program running on a computing device receives a search query. The backup program transmits the search query to a search program. The backup program receives search results corresponding to the search query from the search program. The search results include a list of data objects stored on a storage device and that satisfy the search query. The backup program backs up one or more selected data objects of the list of data objects. The backup program can periodically and automatically without user interaction retransmit the search query to the search program, and receive updated search results corresponding to the search query from the search program. The updated search results include an updated list of data objects stored on the storage device that satisfy the search query. The backup program can then back up the data objects within the updated list of data objects.

20 Claims, 3 Drawing Sheets

BACKING UP DATA OBJECTS IDENTIFIED BY SEARCH PROGRAM AND CORRESPONDING TO SEARCH QUERY

BACKGROUND

Data is the lifeblood of many individual users as well as entities like businesses and governmental organizations. Many people generate data using computing devices, in the course of their jobs or their personal lives. Furthermore, the computing devices themselves, as well as other devices, may generate data as well. These and other types of data are typically stored on storage devices, like hard disk drives and other types of storage devices.

SUMMARY OF THE INVENTION

A method of an embodiment of the invention includes receiving a search query, by a backup program running on a computing device. The method includes transmitting the search query by the backup program to a search program. The method includes receiving search results corresponding to the search query, by the backup program from the search program. The search results include a list of data objects stored on a storage device and that satisfy the search query. The method includes backing up one or more selected data objects of the list of data objects, by the backup program.

A computer-readable storage medium of an embodiment of the invention has computer-readable code embodied therein. The computer-readable code is executable by a processor. The computer-readable code includes first computer-readable code to receive a search query. The computer-readable code includes second computer-executable code to transmit the search query to a search program. The computer-readable code includes third computer-executable code to receive search results corresponding to the search query from the search program. The search results include a list of data objects stored on a storage device and that satisfy the search query. The computer-readable code includes fourth computer-executable code to back up one or more selected data objects of the list of data objects.

A system of an embodiment of the invention includes a computer-readable data storage medium to store a backup program, and a processor to execute the backup program from the computer-readable data storage medium. The backup program is to receive a search query, to transmit the search query to a search program. The backup program is to receive from the search program search results corresponding to and satisfying the search query and that includes a list of data objects stored on a storage device. The backup program is to back up one or more selected data objects of the list of data objects.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
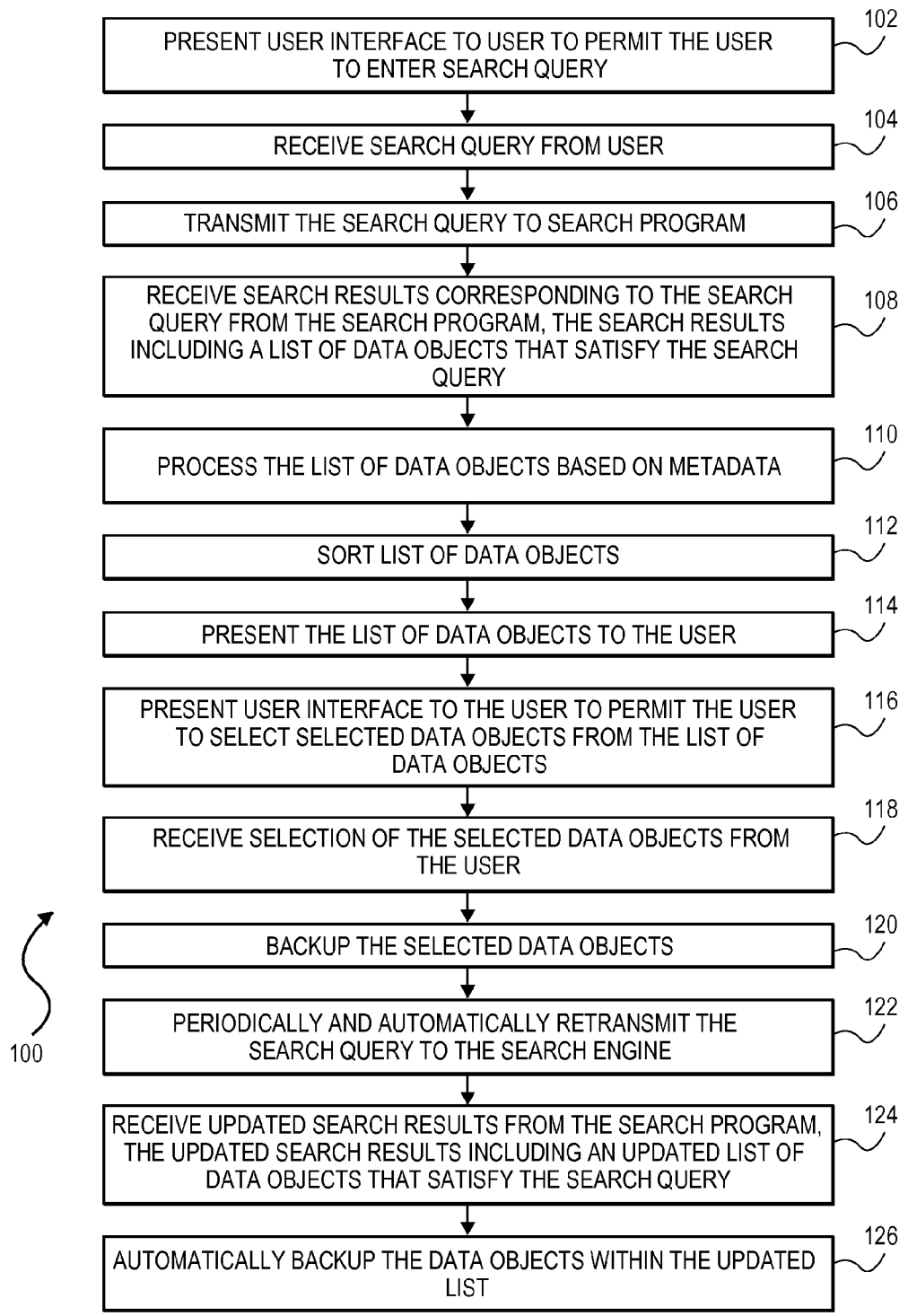
FIG. 1 is a flowchart of a method to back up data objects located by a search program, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, data that is generated by users and devices is stored on storage devices, and can be important. However, storage devices occasionally fail. As such, a backup program may be used to periodically or continuously back up the data to another storage device.

However, while some data may be important, other data may not be as important, and thus does not require backup. Furthermore, some data may be more important than other data, and therefore require backup more often than less important data. Typically, a user is permitted to select which data objects, such as which data files, are to be backed up, and how often these data objects are to be backed up.

However, requiring a user to locate the data objects that are to be backed up is a process that is fraught with peril. The user may accidentally forget to back up important data, and only discover too late that the data is lost when the storage device it is stored on has failed. Alternatively, the user may select data for backup that is not important, using up precious backup storage device resources that are better allocated for backing up more important data.

Disclosed herein are approaches that alleviate these problems. A backup program receives a search query, such as from a user, and transmits the search query to a search program. The backup program receives search results corresponding to the search query from the search program. The search results include a list of data objects stored on a storage device and that satisfy the search query. The backup program backs up one or more selected data objects of the list of data objects.

In this way, an existing search program can be leveraged by a backup program to assist the user in locating the data objects that are to be backed up. A user can more naturally specify the data objects that are to be backed up, by specifying a search query that can relate to important subject matter, such that data objects that satisfy this search query are backed up. As such, the user is less likely to forget to back up important data objects, because the search program will locate the data objects that satisfy the specified search query. The user thus has an alternative to specifying data objects for backup that may not be as important, insofar as these data objects do not satisfy the search query.

FIG. 1 shows a method 100, according to an embodiment of the invention. The method 100 is performed by a backup program running on a computing device, such as a desktop computer or a laptop computer. A search program is also running on the computing device, or on another computing device. Examples of such search programs include search programs that are built into and/or that come with operating systems, as well as search programs that are available from entities for use with the operating systems of these or other entities. A search program can run in the background while a user is performing other tasks on a computing device, so that the search program indexes data objects as they are generated or updated.

The backup program is able to back up data objects stored on a storage device, such as a hard disk drive, or another type of storage device, to another storage device. The storage device on which the data objects are initially stored may be plural storage devices. The storage device may be part of the computing device on which the backup program is running, or a storage device that is otherwise accessible by the backup program. A data object can include one or more of the following: a file of data, an email message; a web page; an instant message; a contact entry; a calendar entry; a task entry; a note entry; and, a journal entry.

A file of data is a file that is stored on a filesystem of the storage device and that contains data. An email message is received by or generated using an email messaging program, like a personal-information management (PIM) program running on the computing device, and which is stored on the storage device. A web page is stored on the storage device as well, and may be generated using a web browsing program running on the computing device. Similarly, an instant message is stored on the storage device, and may be generating using an instant message program running on the computer device. Contact entries, calendar entries, task entries, note entries, and journal entries are likewise stored on the storage device, and may be generating by a computer program running on the computing device, such as a PIM program.

The backup program presents a user interface to the user to enter a search query (102). The search query relates to the data objects that the user wants to back up. For instance, the user may enter words to be searched for within content of the data objects stored on the storage device. The content of a data object is the actual data of the data object. For example, in relation to a word processing data file, the content of this data object includes the actual characters that were entered by a user and saved as part of the data file.

The user may further or alternatively enter words to be searched for within metadata of the data objects stored on the storage device. Such metadata can include the title of a data file, for instance. The user may also be permitted to enter properties to be searched for within this metadata. An example of such a property is data object type, such as data file type, which can include .TXT files, .DOC files, and so on. Another example of such a property is the location at which a data object is stored on the storage device. For instance, for a data file, the location may be specifies as a path, like "drive:\folder1\folder2\," where "drive:" identifies a logical volume on the storage device, where "folder1" and "folder2" specify folders or directories within this logical volume, and where folder2 is located within folder1.

Figure 2:
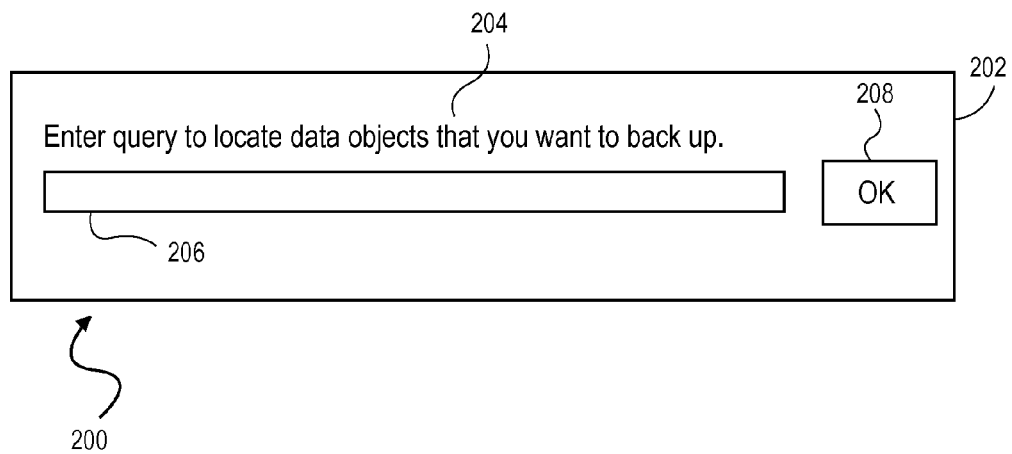
FIG. 2 is a diagram of a graphical user interface (GUI) by which a user can specify a query to locate data objects to be backed up by a backup program, using a search program, according to an embodiment of the invention.

FIG. 2 shows an example graphical user interface (GUI) 200 by which a user can enter a search query, according to an embodiment of the invention. The GUI 200 is displayed on a display device of the computing device. The GUI 200 is in the form of a window or dialog box 202. Within the window or dialog box 202 are the text instructions 204, "Enter a query to locate data objects that you want to back up." Once the user enters in a search query into a corresponding text entry box 206, he or she selects the OK button 208, or presses return.

Referring back to FIG. 1, the backup program thus receives the search query as entered by the user (104). The backup program transmits the search query to a search program (106). For example, the search program may expose an application programming interface (API) that the backup program can call, where the search query is a parameter when calling the search program. Responsive to receiving the search query, the search program searches for data objects stored on the storage device that satisfy the search query transmitted by the backup program.

The backup program therefore receives search results corresponding to the search query, from the search program (108). The search results include a list of data objects that satisfy the search query. The search results can also include metadata regarding the data objects, such as but not limited to the metadata that has been described above. The backup program may process the list of data objects based on this metadata (110). For example, the backup program may perform searching or matching based on this metadata, to further pare down the search results received.

The backup program may further sort the list of data objects in accordance with a predetermined order (112). For instance, the user may be permitted when entering the search query in part 102 to specify the predetermined order in which the list of data objects is sorted. One example of a predetermined order includes the dates when the data objects were generated or last updated, such that more recently updated or generated data objects are located at the top of the list. Another example of a predetermined order includes the relevancy of the data objects to the search query, such that more relevant data objects are located at the top of the list.

The backup program may present the list of data objects to the user (114), as may have been sorted in part 112, such as by displaying the data objects in a list on a display device of the computing device. The backup program may present a user interface to the user, to permit the user to select selected data objects from the list of data objects (116). The selected data objects are those data objects that the backup program will actually back up. By default, all the data objects within the list of data objects may be preselected, and the user provided an opportunity to deselect, or reselect, data objects as desired.

Figure 3:
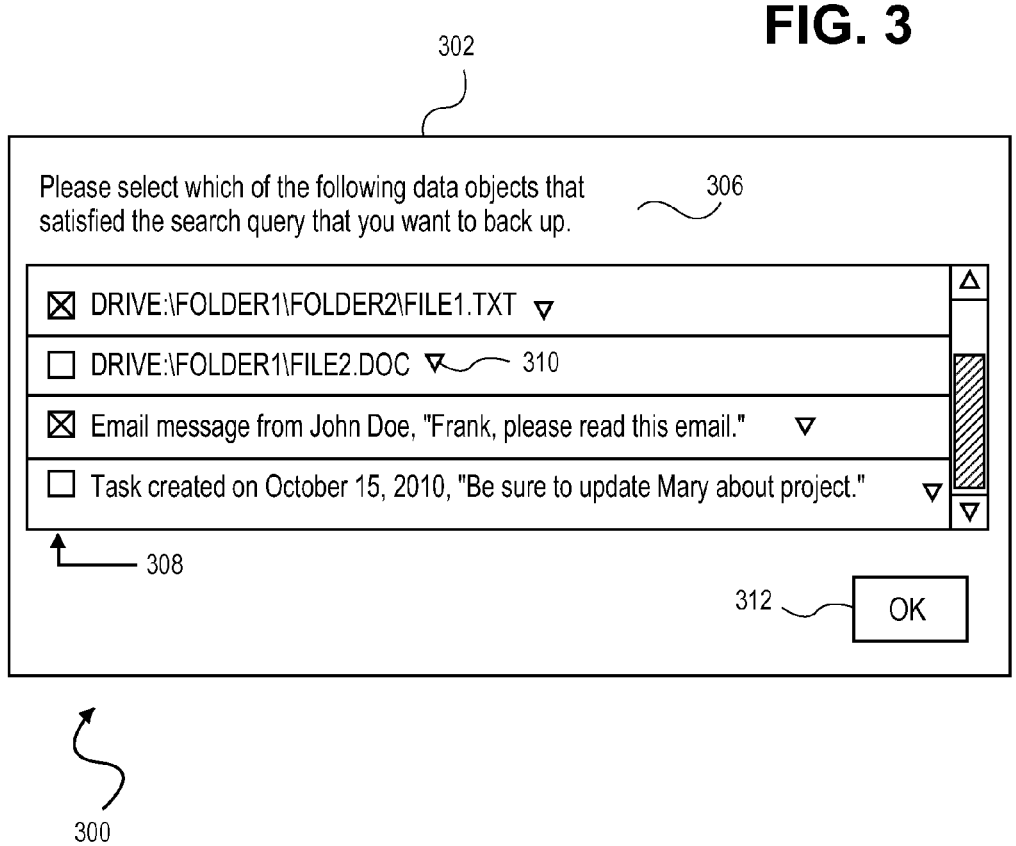
FIG. 3 is a diagram of a GUI by which a user can select data objects to be backed up by a backup program, from a list of data objects that satisfy a search query, as returned by a search program, according to an embodiment of the invention.

FIG. 3 shows an example GUI 300 by which a user can select selected data objects from the list of data objects for backing up, according to an embodiment of the invention. The GUI 300 is displayed on a display device of the computing device. The GUI 300 is in the form of a window or dialog box 302. Within the window or dialog box 302 are the text instructions 304, "Please select which of the following data objects that satisfied the query that you want to back up." The user is permitted to deselect and reselect each of the data objects 306 by unchecking and checking the corresponding checkboxes 308. The user may be permitted to see additional information regarding a data object 306, such as the metadata of the data object 306, by selecting a "more" GUI element 310 to the right of each data object 306. Once the user is satisfied with his or her selections, he or she selects the OK button 312, or presses return.

Referring back to FIG. 1, the backup program thus can receive the user's selection of the selected data objects from the user (118). The backup program then backs up the selected data objects (120), such as to a different storage device than the storage device on which the selected data objects were initially located. It is noted that in another embodiment, one or more of the parts 110-118 may not be performed. For instance, the list of data objects may not be processed and/or sorted. Additionally or alternatively, the user may not be provided with an opportunity to select the selected data objects from the list of data objects. In this latter embodiment, all the data objects within the list are therefore presumed to be selected data objects that are backed up, and after the user has entered the search query, no further user interaction is required.

Furthermore, in one embodiment, the backup program may periodically and automatically retransmit the search query to the search engine (122), without user interaction. For example, in part 102 the user may have the option to specify that the search query should be periodically and automatically retransmitted to the search engine. As such, once the user selects this option, the retransmission of the search query by the backup program does not require any additional user interaction.

In response, the backup program receives updated search results corresponding to the search query, from the search program (124). As in part 108, the updated search results include an updated list of data objects that satisfy the search query. Any of these data objects within the updated list that were newly generated or updated since the last time the search query was transmitted to the search program are automatically updated by the backup program (126).

As an example of the performance of parts 122-126, the user may initially have specified a search query as "special project ABCD1234," where "ABCD1234" is the project identifier of a special project on which the user is working. As such, any time the user generates a new data object regarding this special project, or updates an existing data object regarding this special project, the data object in question will be automatically backed up the next time the backup program retransmits the search query to the search program. This is because the search program will have located the data object, and will have returned the identity of the data object in the updated list of data objects that satisfy the search query. Therefore, the user can rest assured that newly updated or generated data objects related to the special project will be backed up, even without the user having to manually specify such data objects for backup.

Figure 4:
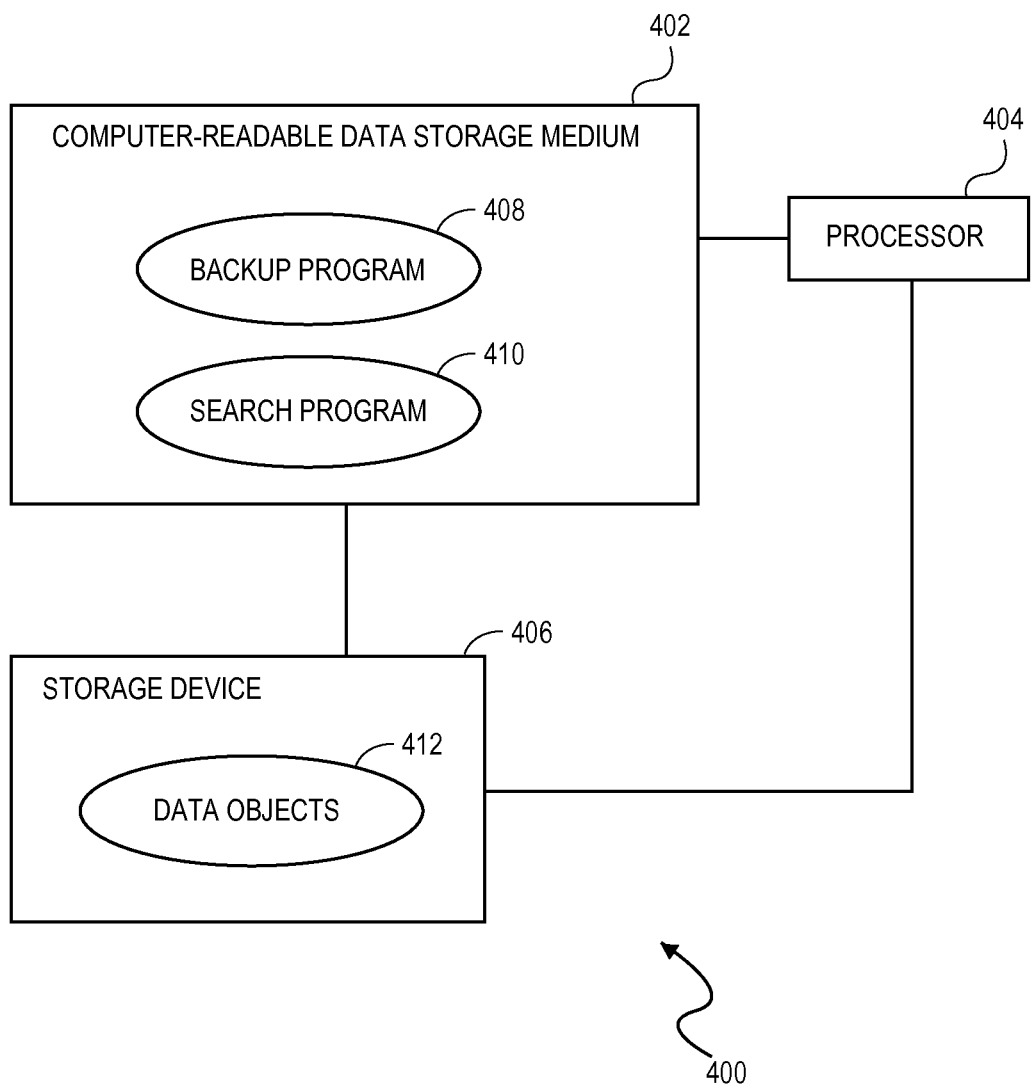
FIG. 4 is a diagram of a system for a backup program to back up data objects located by a search program, according to an embodiment of the invention.

FIG. 4 shows a representative system 400, according to an embodiment of the invention. The system 400 may be implemented using one or more computing devices, such as desktop or laptop computers. The system 400 includes a computer-readable data storage medium 402, a processor 404, and a storage device 406. The system 400 can include other components, in addition to and/or in lieu of those depicted in FIG. 4.

The computer-readable data storage medium 402 may be a hard disk drive, a semiconductor memory, or another type of computer-readable data storage medium. The computer-readable data storage medium 402 may in one embodiment be or coincide with the storage device 406. The computer-readable data storage medium 402 stores a backup program 408 and a search program 410. By comparison, the storage device 406 may be or include one or more hard disk drives, and/or other types of storage devices. The storage device 406 stores data objects 412.

The backup program 408 is executed by the processor 404 to perform the method 100 of FIG. 1 that has been described. As such, the backup program 408 permits a user to specify the data objects that are to be backed up, via a search query, such that the user does not have to manually specify each data object to be backed up. The search program 410 is also executed by the processor 404. The search program 410 typically runs in the background while a user is performing other tasks on the system 400, and indexes data objects as they are generated or updated, so that searching the data objects pursuant to search queries like those transmitted by the backup program 408 can be achieved quickly.

The primary functionality of the search program 410 may be for locating data objects via a user him or herself entering search queries using the search program 410 directly. That is, the primary functionality of the search program 410 in this embodiment is not for locating data objects to backup in communication with the backup program 408. Rather, in such an embodiment, the functionality exposed by the search program 410, such as via an API, for utilization of the search program 410 by computer programs like the backup program 408 is ancillary to the primary functionality of the search program 410. It is noted, therefore, that the backup program 408 itself does not perform any part of the searching for data objects, other than to submit a search query to the search program 410. Rather, the entirety of the search process is performed by the search program 410, upon the search program 410 receiving a search query.

Finally, it is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   receiving a search query, by a backup program running on a computing device;
   transmitting the search query by the backup program to a search program also running on the computing device, the search program different than and not part of the backup program, the search program being a preexisting computer program, the search program being a search computer program not explicitly tailored to the backup program and not explicitly designed for usage with the backup program in particular,
       wherein the search program is one of: a search program built into an operating system running on the computing device, a search program available from a third party for usage with the operating system running on the computing device;
   receiving search results corresponding to the search query, by the backup program from the search program, the search results comprising a list of data objects stored on a storage device and that satisfy the search query; and,
   backing up one or more selected data objects of the list of data objects, by the backup program.

2. The method of claim 1, wherein each data object of the list of data objects comprises one of: a file of data; an email message; a web page; an instant message; a contact entry; a calendar entry; a task entry; a note entry; and, a journal entry.

3. The method of claim 1, further comprising presenting a user interface to a user, by the backup program, the user interface permitting the user to enter the search query,
   wherein the search query is received from the user by the user entering the search query using the user interface presented.

4. The method of claim 1, wherein the search query comprises one or more of:
   one or more first words to be searched for within content of data objects stored on the storage device;
   one or more second words to be searched for within metadata of the data objects stored on the storage device, the metadata comprising at least a title of each data object stored on the storage device;
   one or more properties to be searched for within the metadata of the data objects stored on the storage device, the properties comprising one or more of a data object type of each data object stored on the storage device, and a location in which each data object is stored on the storage device.

5. The method of claim 1, wherein transmitting the search query by the backup program to the search program comprises calling the search program by the backup program using an application programming interface (API) of the search program, where the search query is a parameter when calling the search program.

6. The method of claim 1, further comprising, after receiving the search results by the backup program:
presenting the list of data objects, by the backup program, to a user; and,
receiving from the user the one or more selected data objects from the list of data objects presented to the user, by the backup program.

7. The method of claim 6, further comprising presenting a user interface to the user, the user interface permitting the user to select the one or more selected data objects,
wherein the one or more selected data objects are received from the user by the user using the user interface presented.

8. The method of claim 6, further comprising, before presenting the list of data objects to the user, sorting the list of data objects in accordance with a predetermined order, by the backup program,
wherein the list of data objects is presented in the predetermined order, as sorted by the backup program.

9. The method of claim 8, wherein the predetermined order is specified by the user when the user provides the search query to the backup program.

10. The method of claim 1, wherein receiving the search results corresponding to the search query comprises receiving metadata regarding each data object of the list of data objects,
and wherein the method further comprises processing the list of data objects based on the metadata received regarding each data object.

11. The method of claim 1, wherein the one or more selected data objects are all the data objects within the list of data objects, such that the backup program backs up all the data objects within the list of data objects without user interaction after the search query has been received by the backup program.

12. The method of claim 1, further comprising:
periodically and automatically without user interaction retransmitting the search query by the backup program to the search program;
receiving updated search results corresponding to the search query, by the backup program from the search program, the updated search results comprising an updated list of data objects stored on the storage device that satisfy the search query; and,
backing up the data objects within the updated list of data objects, by the backup program.

13. The method of claim 1, wherein the search program is running on the computing device on which the backup program is running, and wherein the storage device is a storage device that is accessible to the computing device.

14. The method of claim 1, wherein the backup program is a computer program that backs up data objects stored on the storage device to another storage device, and wherein the search program is a computer program that indexes the data objects stored on the storage device and that permits a user to search content of the data objects.

15. A computer program product comprising:
a storage device having computer-readable code embodied therein, the computer-readable code executable by a processor, the computer-readable code comprising:
first computer-readable code to receive a search query;
second computer-executable code to transmit the search query to a search program, the search program different than and not part of the backup program, the search program being a preexisting computer program, the search program being a search computer program not explicitly tailored to the backup program and not explicitly designed for usage with the backup program in particular,
wherein the search program is one of: a search program built into an operating system, a search program available from a third party for usage with the operating system;
third computer-executable code to receive search results corresponding to the search query from the search program, the search results comprising a list of data objects stored on a storage device and that satisfy the search query; and,
fourth computer-executable code to back up one or more selected data objects of the list of data objects.

16. The computer program product of claim 15, wherein the computer-executable code further comprises fifth computer-executable code to present the list of data objects to a user, and to receive from the user the one or more selected data objects from the list of data objects presented to the user.

17. The computer program product of claim 15, wherein the second computer-executable code is to periodically and automatically without user interaction retransmit the search query to the search program,
wherein the third computer-executable code is to receive updated search results corresponding to the search query from the search program, the updated search results comprising an updated list of data objects stored on the storage device that satisfy the search query,
and wherein the fourth computer-executable code is to back up the data objects within the updated list of data objects.

18. A system comprising:
a non-transitory computer-readable data storage medium to store a backup program;
a processor to execute the backup program from the non-transitory computer-readable data storage medium,
wherein the backup program is to receive a search query, to transmit the search query to a search program, to receive from the search program search results corresponding to and satisfying the search query and that comprise a list of data objects stored on a storage device, and to back up one or more selected data objects of the list of data objects,
wherein the search program is different than and not part of the backup program, the search program is a preexisting computer program, the search program is a search computer program not explicitly tailored to the backup program and not explicitly designed for usage with the backup program in particular,
and wherein the search program is one of: a search program built into an operating system running on the computing device, a search program available from a third party for usage with the operating system running on the computing device.

19. The system of claim 18, wherein the non-transitory computer-readable data storage medium further is to store the search program, and wherein the processor is further to execute the search program from the non-transitory computer-readable data storage medium.

20. The system of claim 18, further comprising the storage device.

* * * * *